(12) United States Patent
Swami

(10) Patent No.: US 12,743,513 B2
(45) Date of Patent: Sep. 22, 2026

(54) SYSTEM AND METHOD FOR RANSOMWARE SCAN USING INCREMENTAL DATA BLOCKS

(71) Applicant: DRUVA INC., Santa Clara, CA (US)

(72) Inventor: Uday Sanjay Swami, Pune (IN)

(73) Assignee: DRUVA INC., Santa Clara, CA (US)

( * ) Notice: Subject to any disclaimer, the term of this patent is extended or adjusted under 35 U.S.C. 154(b) by 308 days.

(21) Appl. No.: 18/593,034

(22) Filed: Mar. 1, 2024

(65) Prior Publication Data

US 2024/0202332 A1 Jun. 20, 2024

(30) Foreign Application Priority Data

Nov. 15, 2023 (IN) ............................ 202341077782

(51) Int. Cl.
*G06F 21/56* (2013.01)
*G06F 11/1446* (2026.01)

(52) U.S. Cl.
CPC ........ *G06F 21/565* (2013.01); *G06F 11/1451* (2013.01); *G06F 2201/84* (2013.01); *G06F 2221/034* (2013.01)

(58) Field of Classification Search
CPC ............... G06F 21/565; G06F 11/1451; G06F 2201/84; G06F 2221/034; G06F 11/1469
See application file for complete search history.

(56) References Cited

U.S. PATENT DOCUMENTS

2008/0263658 A1* 10/2008 Michael ................ G06F 21/562 726/22
2011/0010515 A1* 1/2011 Ranade ............... G06F 11/1451 718/1
2018/0107824 A1* 4/2018 Gibbons, Jr. ......... G06F 21/565
2019/0138727 A1* 5/2019 Dontov ............... G06F 11/1464
2020/0319979 A1* 10/2020 Kulaga ............... G06F 11/3006
2021/0312066 A1* 10/2021 Hansen ............... G06F 11/1451
2024/0354411 A1* 10/2024 Wang .................... G06F 21/566

* cited by examiner

*Primary Examiner* — Lesa M Kennedy
(74) *Attorney, Agent, or Firm* — Vorys, Sater, Seymour and Pease LLP

(57) ABSTRACT

A system for performing ransomware scan is presented. The system includes a snapshot access module configured to access a base snapshot corresponding to a dataset. The system further includes a log access module configured to access a log of modified metadata and/or data blocks from a data back-up server corresponding to a subsequent snapshot versus the base snapshot. The system moreover includes an incremental block module configured to download one or more incremental metadata and/or data blocks from the data back-up server based on the log of modified metadata and/or data blocks. The system further includes a snapshot write module configured to write the one or more incremental metadata and/or data blocks on the base snapshot to generate an incremental snapshot. The system furthermore includes a ransomware scan module configured to scan the incremental snapshot to check for ransomware. A related method is also presented.

18 Claims, 6 Drawing Sheets

SYSTEM AND METHOD FOR RANSOMWARE SCAN USING INCREMENTAL DATA BLOCKS

PRIORITY STATEMENT

The present application claims priority under 35 U.S.C. § 119 to Indian patent application number 202341077782 filed 15 Nov. 2023 the entire contents of which are hereby incorporated herein by reference.

BACKGROUND

Embodiments of the present invention generally relate to ransomware scan systems and methods, and more particularly to ransomware scan systems and methods using incremental data blocks.

Enterprises these days seek reliable, cost-effective ways to protect the data stored on their computer networks while minimizing the impact on productivity. An enterprise might back up critical computing systems such as databases, file servers, web servers, virtual machines, and as part of a daily, weekly, or monthly maintenance schedule. The backup may be performed by storing a plurality of snapshots at pre-defined intervals. In the event of data loss or data corruption because of malware/ransomware, the backed-up data may be restored to the primary data source or another restore destination. However, current methods and systems for malware/ransomware scans may only provide an option for restoring each snapshot before performing the malware/ransomware scan. Therefore, the current methods and systems for malware/ransomware scans may require a significant amount of download time and bandwidth utilization. Further, such methods may also incur a significant amount of data transfer and bandwidth-related costs.

SUMMARY

The following summary is illustrative only and is not intended to be in any way limiting. In addition to the illustrative aspects, example embodiments, and features described, further aspects, example embodiments, and features will become apparent by reference to the drawings and the following detailed description.

Briefly, according to an example embodiment, a system for performing ransomware scan is presented. The system includes a snapshot access module configured to access a base snapshot corresponding to a dataset. The system further includes a log access module configured to access a log of modified metadata and/or data blocks from a data back-up server corresponding to a subsequent snapshot versus the base snapshot. The system moreover includes an incremental block module configured to download one or more incremental metadata and/or data blocks from the data back-up server based on the log of modified metadata and/or data blocks. The system further includes a snapshot write module configured to write the one or more incremental metadata and/or data blocks on the base snapshot to generate an incremental snapshot. The system furthermore includes a ransomware scan module configured to scan the incremental snapshot to check for ransomware.

According to another example embodiment, a method for performing a ransomware scan is presented. The method includes accessing a base snapshot corresponding to a dataset; accessing a log of modified metadata and/or data blocks from a data back-up server corresponding to a subsequent snapshot versus the base snapshot; downloading one or more incremental metadata and/or data blocks from the data back-up server based on the log of modified metadata and/or data blocks; writing the one or more incremental metadata and/or data blocks on the base snapshot to generate an incremental snapshot; and scanning the incremental snapshot to check for ransomware.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Figure 1:
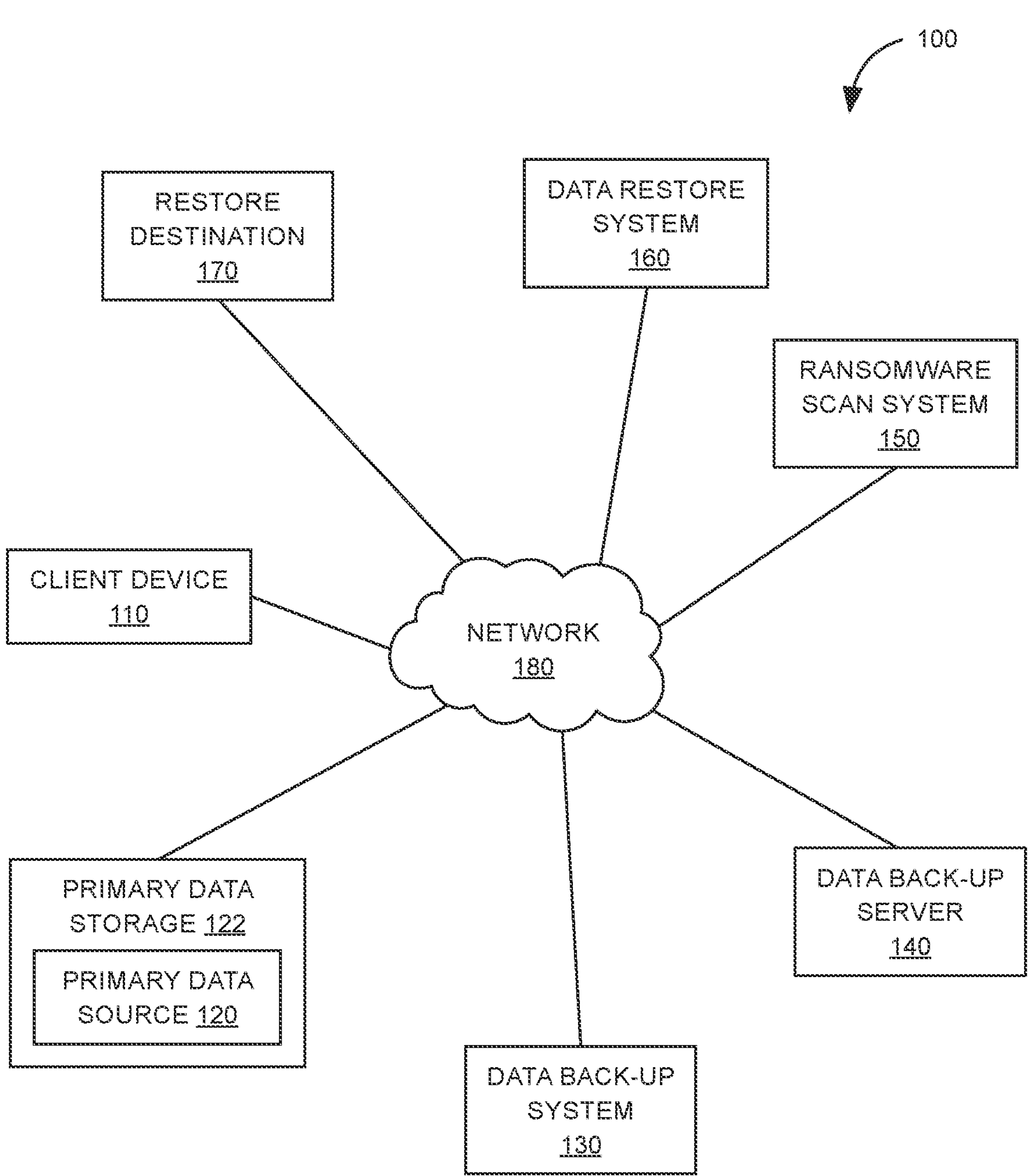
FIG. 1 is a block diagram illustrating an example data back-up and restore system environment, according to some aspects of the present description.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein. On the contrary, example embodiments are to cover all modifications, equivalents, and alternatives thereof.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figures. It should also be noted that in some alternative implementations, the functions/acts/steps noted may occur out of the order noted in the figures. For example, two figures shown in succession may, in fact, be executed substantially concurrently or may sometimes be executed in the reverse order, depending upon the functionality/acts involved.

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or a section. Thus, a first element, component, region, layer, or section discussed below could be termed a second element, component, region, layer, or section without departing from the scope of example embodiments.

Spatial and functional relationships between elements (for example, between modules) are described using various terms, including "connected," "engaged," "interfaced," and "coupled." Unless explicitly described as being "direct," when a relationship between first and second elements is described in the description below, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless specifically stated otherwise, or as is apparent from the description, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Example embodiments of the present description provide systems and methods for ransomware scans. Some embodiments of the present description provide systems and methods for ransomware scans using incremental data blocks.

FIG. 1 illustrates an example data back-up and restore system environment 100, in accordance with some embodiments of the present description. The system environment 100 includes a client device 110, a primary data source 120, a primary data storage 122, a data back-up system 130, a data back-up server 140, a ransomware scan system 150, a data restore system 160, and a restore destination 170.

The system environment 100 may be configured to store back-up data from the primary data source 120 in the data back-up server 140 using the data back-up system 130. Further, the system environment 100 may be configured to restore at least a portion of the back-up data to the restore destination 170 using the data restore system 160. As described in detail later, the data restore system 160 may be configured to restore at least a portion of the dataset once a safe snapshot is identified by the ransomware scan system 150. The primary data source 120 stores data generated by the client device 110, and although the primary data source 120 and the client device 110 are represented as two different blocks, the primary data source 120 may be present in the client device 110 itself. Similarly, although the data restore destination 150 and the client device 110 are represented as two different blocks, in some embodiments, the data restore destination 170 may be present in the client device 110 itself. Further, in some embodiments, a location of the data restore destination 170 may be the same as a location of the primary data source 120.

The client device 110 may be any computing device that has data that may need back-up. Examples of such client devices 110 include without limitation, workstations, personal computers, desktop computers, or other types of generally fixed computing systems such as mainframe computers, servers, and minicomputers. Other examples of such client devices 110 include mobile or portable computing devices, such as one or more laptops, tablet computers, personal data assistants, mobile phones (such as smartphones), IoT devices, wearable electronic devices such as smartwatches, and other mobile or portable computing devices such as embedded computers, set-top boxes, vehicle-mounted devices, wearable computers, etc. Servers can include mail servers, file servers, database servers, virtual machine servers, and web servers.

In some embodiments, a client device 110 includes cloud computing resources, which may be implemented as virtual machines. For instance, one or more virtual machines may be provided to the organization by a third-party cloud service vendor. In some embodiments, the client device 110 can include one or more virtual machine(s) running on a physical host computing device (or "host machine") operated by the organization. As one example, the organization may use one virtual machine as a database server and another virtual machine as a mail server, both virtual machines operating on the same host machine. A Virtual machine ("VM") is a software implementation of a computer that does not physically exist and is instead instantiated in an operating system of a physical computer (or host machine) to enable applications to execute within the VM's environment, i.e., a VM emulates a physical computer. A VM includes an operating system and associated virtual resources, such as computer memory and processor(s). A hypervisor operates between the VM and the hardware of the physical host machine and is generally responsible for creating and running the VMs. Hypervisors are also known in the art as virtual machine monitors or virtual machine managers or "VMMs", and may be implemented in software, firmware, and/or specialized hardware installed on the host machine. The hypervisor provides resources to each virtual operating system such as a virtual processor, virtual memory, a virtual network device, and a virtual disk.

Further, it should be noted that although FIG. 1 only illustrates a single client device, the data back-up and restore system environment 100 may also include a plurality of client devices. In some such embodiments, the clients may be heterogeneous. For example, the clients may be of different types, such as individual end-users, organizations, businesses, webpage providers, servers, and the like. Although clients may be heterogeneous, from the point of view of the data back-up system 130 and the data restore system 160, the plurality of client devices 110 that may need data back-up and restore services may be treated in the same or a similar manner. In some other embodiments, the clients and/or client devices 110 may be of the same type.

The system environment 100 further includes a primary data source 120. In some embodiments, the primary data source 120 is located in a primary data storage 122 configured for mass storage of data. The primary data storage 122 may be packaged/configured with the client device 110 (e.g., an internal hard disk) and/or may be external and accessible by the client device 110 (e.g., network-attached storage, a storage array, etc.). Non-limiting examples of primary data storage 122 include, without limitation, disk drives, storage arrays (e.g., storage-area network (SAN) and/or network-attached storage (NAS) technology), semiconductor memory (e.g., solid-state storage devices), network attached storage (NAS) devices, tape libraries, or other magnetic, non-tape storage devices, optical media storage devices, or combinations thereof. In some embodiments, the primary data storage 122 may be part of a distributed file system. In some embodiments, the primary data storage 122 is provided in a cloud storage environment (e.g., a private cloud or one operated by a third-party vendor).

As noted earlier, in some embodiments, the client device 110 may include one or more virtual machines operating on a physical host machine. In such embodiments, each virtual machine has one or more associated virtual disks and the primary data storage 122 may include one or more of these virtual disks. The hypervisor typically stores the data of virtual disks in files on the file system of the physical host machine, called virtual machine disk files ("VMDK" in VMware language) or virtual hard disk image files (in Microsoft language). A virtual machine reads data from and writes data to its virtual disk much the way that a physical machine reads data from and writes data to a physical disk.

The primary data storage 122 may be dedicated or shared. In some embodiments, each primary data storage 122 is dedicated to an associated client 110, e.g., a local disk drive. In other embodiments, one or more primary data storage 122 can be shared by multiple client devices 110, e.g., via a local network, in a cloud storage implementation, etc.

According to some embodiments, the client device 110 can access data stored in the primary data source 120 by making conventional file system calls via the operating system. Each client device 110 is generally associated with and/or in communication with one or more primary data sources 120 storing data. A client device 110 is said to be associated with or in communication with a particular primary data source 120 if it is capable of one or more of routing and/or storing data to the primary data source 120, coordinating the routing and/or storing of data to the primary data source 110, retrieving data from the primary data source 120, coordinating the retrieval of data from the primary data source 120, and modifying and/or deleting data in the primary data source 120.

The data present in the primary data source 120 is generally data generated by the operating system and/or applications executing on the client device 110. The data is generally stored on primary data storage 122 and may be organized via a hypervisor or a file system operating on the client device 110. Non-limiting examples of suitable file systems may include NTFS (Microsoft proprietary file system), VMDK (VMware proprietary file system), and the like. In general, the data present in the primary data source 120 may include files, directories, file system volumes, data blocks, extents, virtual disks, or any other hierarchies or organizations of data objects. As used herein, the term "data object" refers to (i) any file that is currently addressable by a file system or that was previously addressable by the file system (e.g., an archive file), and/or (ii) a subset of such a file (e.g., a data block, an extent, etc.). The data present in the primary data source 120 may further include structured data (e.g., database files), unstructured data (e.g., documents), and/or semi-structured data. It should be noted that although the patent description describes embodiments of the present invention in the context of a virtual machine (VM), embodiments of the present invention are equally applicable for file systems (FS) as well.

The primary data source 120 also includes metadata associated with the data present in the primary data source 120. Metadata generally includes information about data objects and/or characteristics associated with the data objects. Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists (ACLs), system metadata (e.g., registry information), combinations of the same or other similar information related to the data object. In addition to metadata generated by or related to file systems and operating systems, some applications and/or other components of the client device 110 maintain indices of metadata for data objects, e.g., metadata associated with individual email messages.

The data back-up system 130 may be a software or a hardware component that enables the client device 110 to store and back-up data and search and access the back-up data. The data back-up system 130 may further provide a graphical user interface (not shown) for individual clients to access data back-up server 140 for data management. For example, a graphical user interface may be a front-end storage interface. Additionally, or alternatively, the data back-up system 130 may provide APIs for the access and management of files from the client device 110.

The data back-up system 130 may be configured to perform back up by storing a plurality of snapshots corresponding to the data back-up schedule in the data back-up server 140. In accordance with certain embodiments of the present invention, the data back-up system 130 is configured to perform incremental data back-up. An incremental data back-up is a type of back-up that copies only data that was changed since the previous back-up. Unlike a full back-up where all data is copied to the back-up storage with every back-up job, after an instance of a full back-up, the incremental approach only allows back up of files that were changed since the most recent backup. Thus, incremental back-up reduces storage requirements, bandwidth load, and provides the necessary level of data consistency and availability. In certain embodiments, the data back-up system 130 is configured to perform incremental data back-up based on modified meta-data and data blocks. The term "modified meta-data and data blocks" as used herein refers to blocks of meta-data and/or data that have been added, deleted, or changed since the last data back-up point. A log of the modified meta-data and data blocks may be further stored in the primary data source 120 and/or the data back-up server 140 by the data back-up system 130, as further described in detail later. These logs are typically referred to as CBT (Change Block Tracking) logs in VMware file systems and change journal records in Microsoft NTFS file systems.

The back-up schedule for the client device 110 may be installed with a client utility application or configured within the host operating system (OS), using the data back-up system 120. At the scheduled time, the client device 110 may connect with the data back-up server 140 via the data back-up system 130 to initiate the data back-up process. (either full or incremental). For example, the first instance of data backup may involve a full backup of the data from the primary data source 120 to the data back-up server 140, followed by incremental back-ups depending on the back-up schedule.

The data back-up server 140 may combine hardware and software technologies that provide back-up storage and retrieval services to the client device 110 via the data back-up system 130. In some embodiments, the data back-up server 140 is a cloud-based storage. The back-up data from the primary data source 120 may be stored and backed up in an object-based storage, a file-based storage, or a block-based storage. In some embodiments, the back-up data is stored in a block-based storage. Non-limiting examples of suitable data storage 120 include AWS Elastic Block storage, GOOGLE CLOUD Persistent Disks, RACKSPACE Cloud Block Storage, and the like.

As noted earlier, in the event of data loss, data corruption and/or other disaster-related occurrence, it may be desirable to restore the data from the data back-up server 140. The back-up data may be retrieved or restored using the data restore system 160 in the data back-up and restore system environment 100. The data restore system 160 may be a software or a hardware component that enables the client to restore and access the back-up data. The data restore system 160 may optionally further provide a graphical user interface 152 for individual clients to access and manage the data restored. Additionally, or alternatively, the data restore system 160 may provide APIs for the access and management of files to be restored.

The ransomware scan system 150 is configured to scan one or more datasets for ransomware/malware detection. The ransomware scan system 150 is configured to scan one or more snapshots stored in the data backup server 140 for ransomware/malware detection. Further, the ransomware scan system 150 in accordance with embodiments of the present description is configured to optimally scan the one or more snapshots by using incremental blocks, as described in detail later.

The data restore system 160, is configured to restore data from the data back-up server 140. In some embodiments, the data restore system 160, is configured to restore data from the data back-up server 140 once a safe snapshot is identified by the ransomware scan system 150, as described in detail later. The data back-up and restore system environment 100 further includes a restore destination 170. The restore destination 170 may be located at the same location as the primary data source 120, in some embodiments. In such instances, for example, the data restore system 160 may be configured to overwrite the data on the primary data source 120 to restore the data to a particular point. In such instances, although the data restore destination 150 and the primary data source and/or primary data storage 122 are shown as different blocks, the block representing the data restore destination 170 may be the same as the block representing the primary data source 120. Further, in embodiments where the primary data storage 122 is a storage system internal to the client device 110, the blocks representing the primary data source 120, the primary data storage 122, and the destination location 170 may be present in the client device 110 itself.

In some other embodiments, the restore destination 170 may be located at a location different from the primary data source 120. In some such instances, the restore destination 170 may be at a different location in the primary data storage 122 itself, and the data restore system 160 may be configured to create a clone of the data on the restore destination 170. For example, the restore destination 170 could be a completely new instance to which a VMDK is attached. In such instances, the data restore destination 150 and the primary data source 120 may be shown as different blocks located in the primary data storage 122. Further, in embodiments where the primary data storage 122 is a storage system internal to the client device 110, the blocks representing the primary data source 120, the primary data storage 122, and the destination location 160 may be present in the client device 110 itself.

In some other instances, the restore destination 170 may be located in a secondary data storage (not shown in FIGS.) and the data restore system 160 may be configured to create a clone of the data on the restore destination 170. The secondary data storage may be packaged/configured with the client device 110 (e.g., an internal hard disk) and/or may be external and accessible by the client device 110 (e.g., network-attached storage, a storage array, etc.). Non-limiting examples of secondary data storage include, without limitation, disk drives, storage arrays (e.g., storage-area network (SAN) and/or network-attached storage (NAS) technology), semiconductor memory (e.g., solid state storage devices), network-attached storage (NAS) devices, tape libraries, or other magnetic, non-tape storage devices, optical media storage devices, or combinations thereof. In some embodiments, the secondary data storage is provided in a cloud storage environment (e.g., a private cloud or one operated by a third-party vendor). In such instances, the data restore destination 150 and the primary data source 120 may be shown as different blocks located in primary data storage

122 and secondary data storage, respectively. Further, in embodiments where the primary data storage 122 and the secondary data storage are internal to the client device 110, the blocks representing the primary data source 120, the primary data storage 122, the secondary data storage, and the destination location 170 may be present in the client device 110 itself.

The various components in the system environment 100 may communicate through the network 180 and/or locally. For example, in some embodiments, one of the system components may communicate locally with the data back-up system 130, while other components communicate with the data back-up system 130 through the networks. In other embodiments, every component in the system environment 100 is online and communicates with each other through the network 170. In one embodiment, the network 170 uses standard communications technologies and/or protocols. Thus, the network 170 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 170 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

While the components of the system environment 100 are each represented by a single block in FIG. 1, each of these components may include multiple distributed and/or independent computers (may also be referred to as workers) working cooperatively and in parallel with other computers so that the operation of the entire system will not be affected when one or more workers are down.

Figure 2:
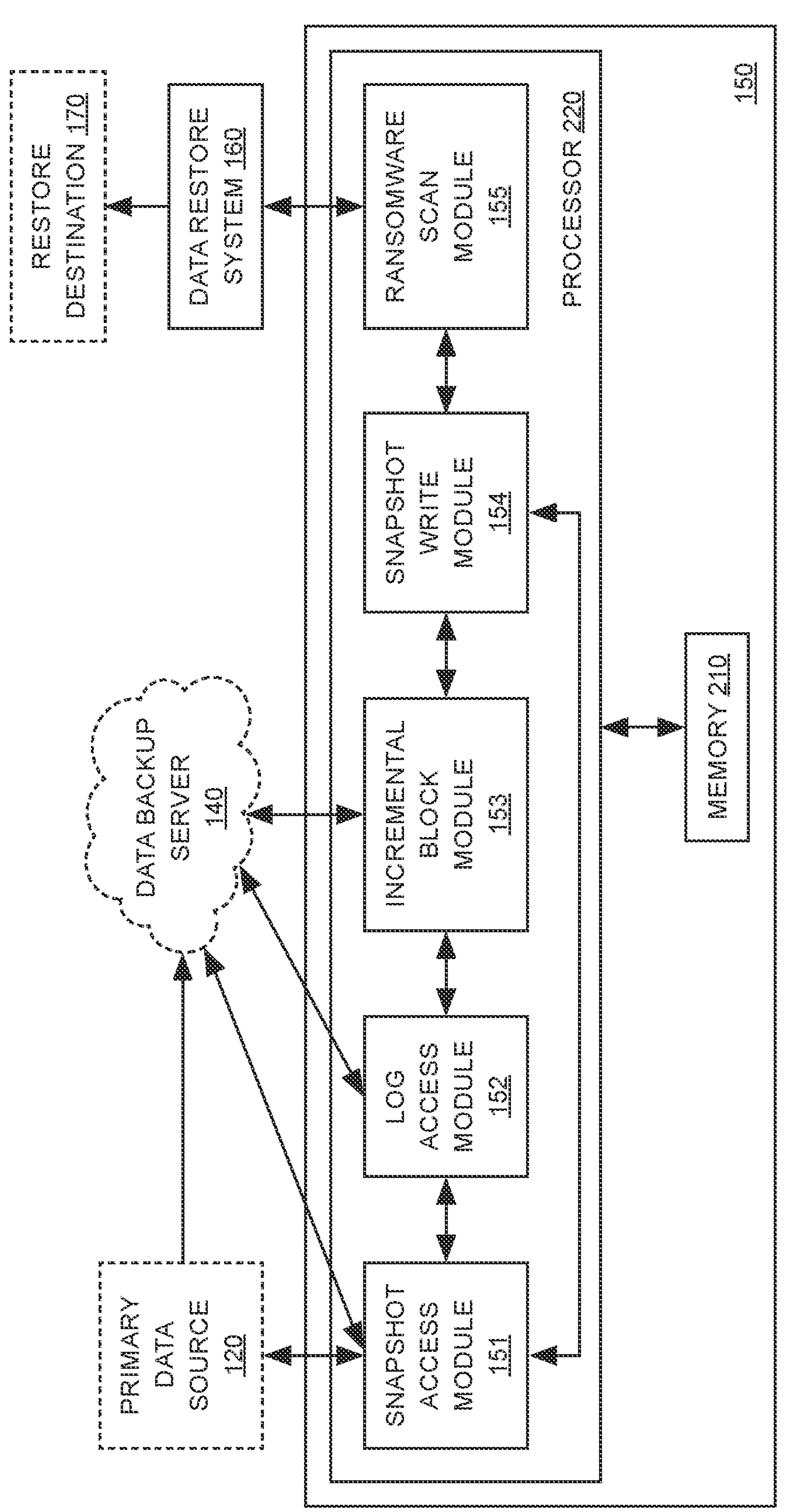
FIG. 2 is a block diagram illustrating an example ransomware scan system, according to some aspects of the present description.

FIG. 2 is a block diagram of a ransomware system 150 for optimally scanning one or more datasets using incremental blocks, in accordance with some embodiments of the present description. The ransomware scan system includes a snapshot access module 151, a log access module 152, an incremental block module 153, a snapshot write module 154, and a ransomware scan module 155. Each of these system components is in data communication with one or more of the primary data source 120, the data back-up server 140, the data restore system 160, and the restore destination 170.

In some embodiments, the ransomware scan system 150 includes a memory 210 storing one or more processor-executable routines, and a processor 220 communicatively coupled to the memory 210 and configured to execute the one or more processor-executable routines. The processor 220 includes a snapshot access module 151, a log access module 152, an incremental block module 153, a snapshot write module 154, and a ransomware scan module 155. Each of these system components is described in more detail below.

The snapshot access module 151 is communicatively coupled to the primary data source 120 and the data backup server 140, and is configured to access a base snapshot corresponding to a dataset. The dataset for which the base snapshot is accessed is the dataset for which a ransomware scan needs to be performed. The term "base snapshot" as used herein refers to a first snapshot in a plurality of snapshots stored in the data back-up server, or a snapshot taken at the start of ransomware scan workflow.

In some embodiments, the snapshot access module 151 is configured to access the base snapshot by accessing a first snapshot in a plurality of snapshots stored in the data back-up server 140 if, for example, one or more snapshots corresponding to the dataset are already stored in the data back-up server 140. The base snapshot in such instances may correspond to snapshot taken at the first restore point (i.e., RP1=RP0).

In some other embodiments, the snapshot access module 151 is configured to access the base snapshot by taking a snapshot at the start of ransomware scan workflow if, for example, a VM is present/accessible in an environment where workflow is executed. As shown in FIG. 2, the snapshot access module 151 is further communicatively coupled to the snapshot write module 154, and provides the base snapshot to the snapshot write module 154.

The log access module 152 is communicatively coupled to the data back-up server 140. The log access module 152 is configured to access a log of modified meta-data and data blocks from the data back-up server 140. As mentioned earlier, modified data blocks or files include data blocks or files that have been added, changed or deleted after a particular back-up point. During an incremental back-up by the data back-up system 130, a log of the modified meta-data and data blocks is generated between the two data back-up points, and includes information corresponding to the data blocks or files that have been added, changed, or deleted between the two back-up points. The log is stored in the data back-up server 140 along with the data that is backed up in the data back-up server. These logs are typically referred to as CBT (Change Block Tracking) logs in VMware file systems and change journal records in Microsoft NTFS file systems. The log access module 152 is configured to access the log of modified metadata and/or data blocks from a data back-up server 140 corresponding to a subsequent snapshot versus the base snapshot. The term "subsequent snapshot" as used herein refers to a snapshot taken before or after the base snapshot. Thus, by way of example if the base snapshot is snapshots then the subsequent snapshot is $\text{snapshot}_{N+1}$ or $\text{snapshot}_{N-1}$. The log access module 152 is communicatively coupled with the incremental block module 153 as shown in FIG. 2.

The incremental block module 153 is configured to download one or more incremental metadata and/or data blocks from the data back-up server 140 based on the log of modified metadata and/or data blocks. The incremental block module 153 is configured to query the data back-up server 140 based on the log of modified metadata and data blocks to identify and download the incremental blocks. The incremental block module 153 is communicatively coupled with the snapshot write module 154 as shown in FIG. 2.

The snapshot write module 154 is further configured to write the one or more incremental metadata and/or data blocks on the base snapshot received from the snapshot access module 151 to generate an incremental snapshot. The snapshot write module 154 is communicatively coupled to the ransomware scan module 155 as shown in FIG. 2. The ransomware scan module 155 is configured to scan the incremental snapshot to check for ransomware. The log access module 152, the incremental block module 153, the snapshot write module 154, and the ransomware scan module 155 are configured to iteratively perform their respective operations for each subsequent snapshot until a safe snapshot is identified.

Thus, instead of restoring the complete snapshot every time a ransomware scan is initiated, the system and method of the present invention provide for incremental data download which allows for deduplication between multiple snapshots thereby optimizing network and computation costs.

Referring again to FIG. 2, in some embodiments, the system environment 100 further includes a data restore system 160 communicatively coupled with the ransomware scan system 150 and a restore destination 170. In some embodiments, the data restore system 150 is configured to restore the dataset to the restore destination 170 based on the identified safe snapshot.

In some embodiments, the data restore system 160 is further configured to create a virtual machine based on the identified safe snapshot. In such instances, the ransomware scan workflow is stopped after a safe snapshot is identified and a VM is spun off from the identified snapshot which has already been downloaded from the data back-up server. In some embodiments, the ransomware scan system 150 may be configured to identify all the snapshots in a given time range and the data restore system 160 may be configured to restore all the identified snapshots within the given time range, In some embodiments, the data restore system 160 is further configured to generate a plurality of cloned disks based on the one or more identified safe snapshots and create a plurality of virtual machines based on the plurality of cloned disks. In such embodiments, the data restore system 160 is configured to create multiple copies of the VM based on one anchor snapshot. This workflow is useful in the case of performing an original restore where the VM present in the customer environment can act as a base snapshot from which multiple safe snapshots can be spun off.

In some embodiments, the data restore system 160 further includes a file restore module 161 configured to restore a safe version of a corrupted file if the ransomware scan module 155 identifies the corrupted file in a scanned snapshot. The term "corrupted file" as used herein refers to a file that has been affected by a malware, e.g., a virus. The file restore module 161 and the corresponding module components are described below with reference to FIG. 3.

Figure 3:
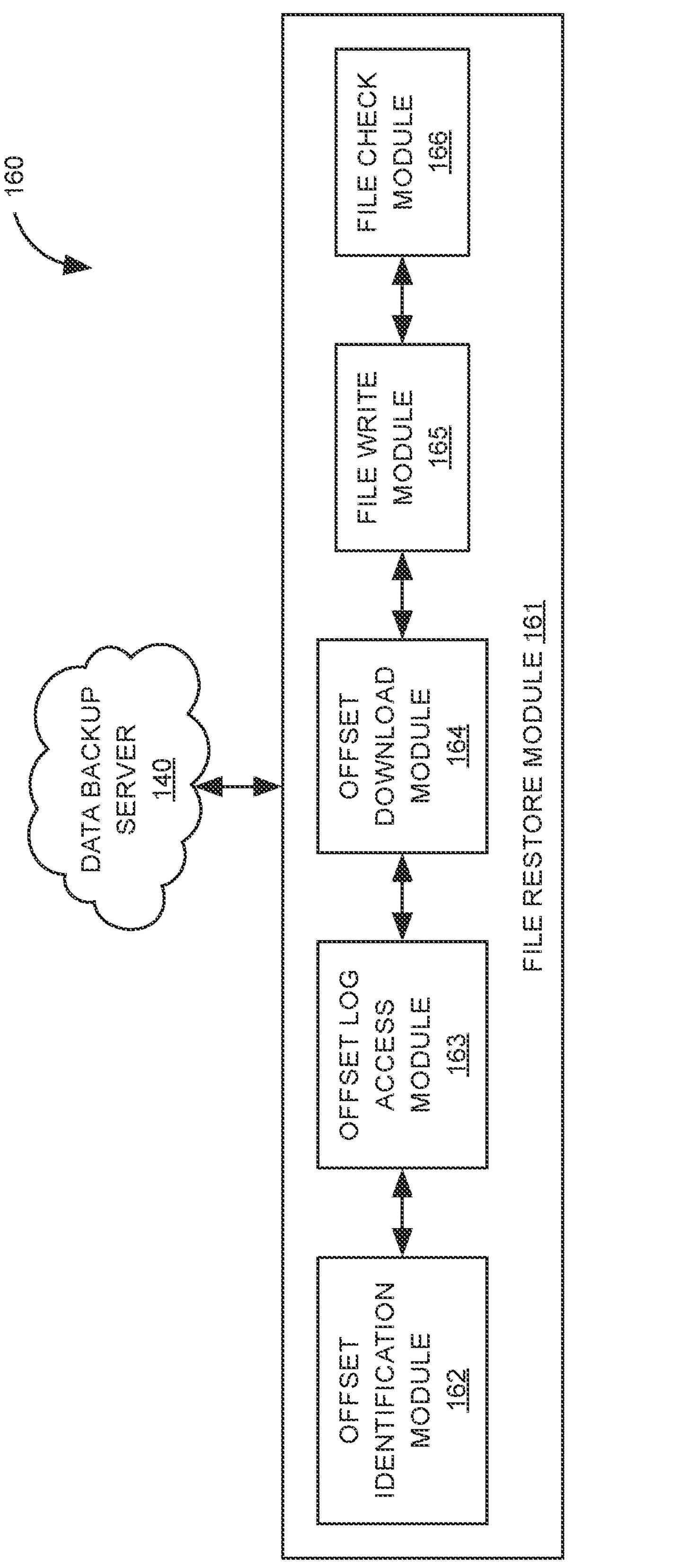
FIG. 3 is a block diagram illustrating an example file restore module, according to some aspects of the present description.

As shown in FIG. 3, the file restore module 161 includes an offset identification module 162 configured to identify a plurality of offsets corresponding to the corrupted file. In some embodiments, the offset identification module is further configured to access a snapshot of a virtual machine and mount the snapshot of the virtual machine as a base disk with the corrupted file to read the corrupted file.

The file restore module 161 further includes an offset log access module 163 configured to access a log of one or more modified offsets from the data back-up server 140 corresponding to the corrupted file. The file restore module 161 further includes an offset download module 164 configured to download the one or more modified offsets from the data back-up server 140 based on the log of one or more modified offsets. The file restore module 161 further includes a file write module 165 configured to write the one or more modified offsets on the corrupted file to generate a modified file.

The file restore module 161 further includes a file check module 166 configured to check whether the modified file corresponds to the safe version of the corrupted file. In some embodiments, the file check module 166 is configured to check whether the modified file corresponds to the safe version of the corrupted file by matching the modified file with a safe version of the corrupted file, or by performing a ransomware scan of the modified file. The safe version of the corrupted file may be provided by the client in some embodiments. Once a safe version of the file is identified, the safe version of the file may be used to replace the corrupted file from running live VM. Thus, according to embodiments of the present invention only data blocks need to be downloaded to access files. The downloaded data blocks can be kept in local snapshot copy of a running VM, and a complete disk download is not required.

Figure 4:
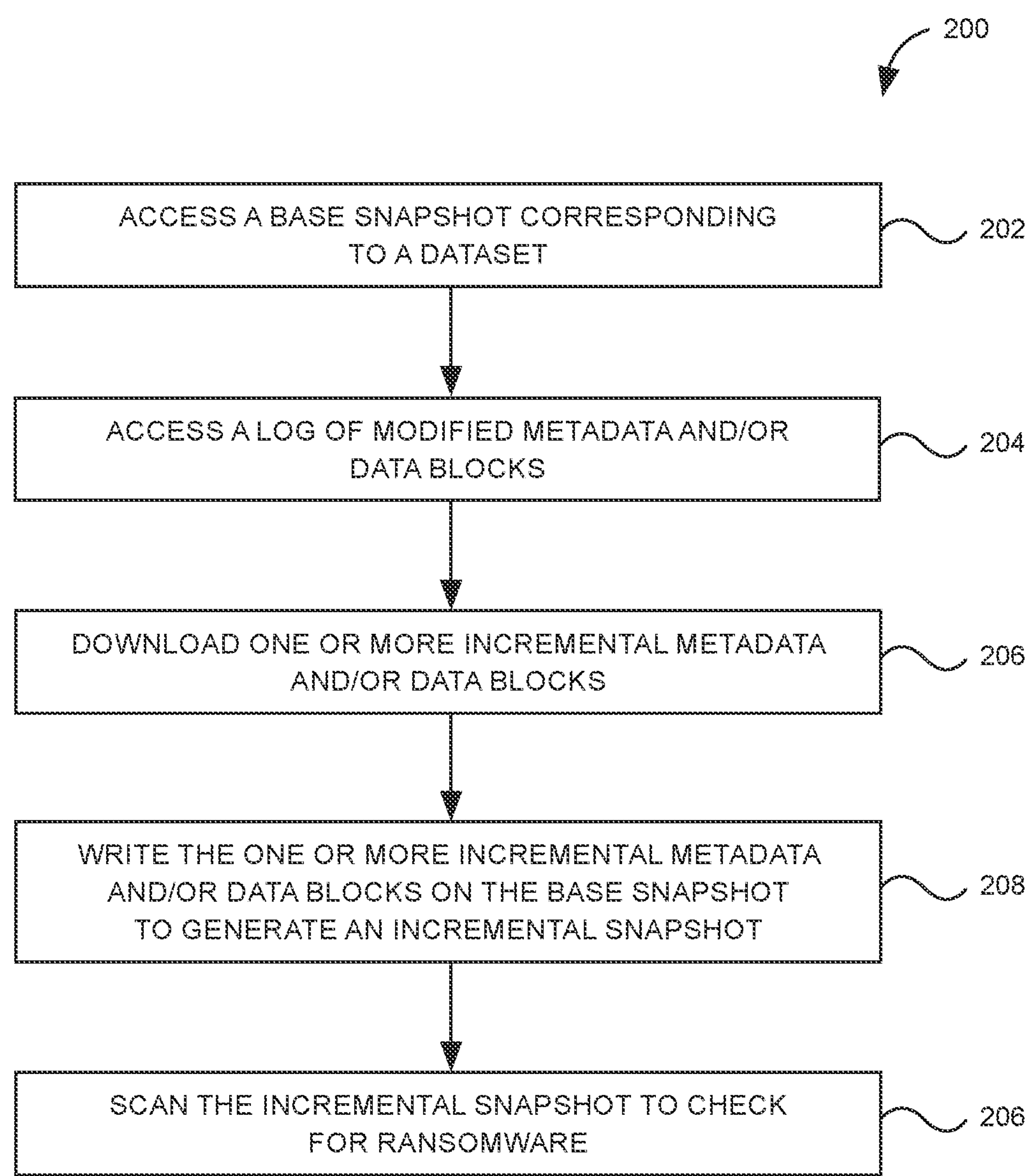
FIG. 4 is a flow chart illustrating a method for performing a ransomware scan, according to some aspects of the present description.

FIG. 4 is a flowchart illustrating a method 200 for performing a ransomware scan according to embodiments of the present description. The method 200 may be implemented using the system of FIG. 2, according to some aspects of the present description. Each step of the method 200 is described in detail below.

At block 202, the method 200 includes accessing a base snapshot corresponding to a dataset. The term "base snapshot" as used herein refers to a first snapshot in a plurality of snapshots stored in the data back-up server, or a snapshot taken at the start of ransomware scan workflow.

In some embodiments, the method 200 includes accessing the base snapshot by accessing a first snapshot in a plurality of snapshots stored in the data back-up server if, for example, one or more snapshots corresponding to the dataset are already stored in the data back-up server. The base snapshot in such instances may correspond to snapshot taken at the first restore point (i.e., RP1=RP0). In some other embodiments, the method 200 includes accessing the base snapshot by taking a snapshot at the start of ransomware scan workflow if, for example, a VM is present/accessible in an environment where workflow is executed.

The method 200 includes, at block 204, accessing a log of modified metadata and/or data blocks from a data back-up server corresponding to a subsequent snapshot versus the base snapshot. The term "subsequent snapshot" as used herein refers to a snapshot taken before or after the base snapshot. Thus, by way of example if the base snapshot is $\text{snapshot}_N$ then the subsequent snapshot is $\text{snapshot}_{N+1}$ or $\text{snapshot}_{N-1}$.

At block 206, the method 200 includes downloading one or more incremental metadata and/or data blocks from the data back-up server based on the log of modified metadata and/or data blocks. The method 200 further includes, at block 208, writing the one or more incremental metadata and/or data blocks on the base snapshot to generate an incremental snapshot. At block 210, the method 200 includes scanning the incremental snapshot to check for ransomware. The method 200, further includes iteratively performing the steps 204-210 for each subsequent snapshot until a safe snapshot is identified.

In some embodiments, the method 200 further includes restoring the dataset to a restore destination based on the one identified safe snapshot. In some embodiments, the method 200 includes creating a virtual machine based on the identified safe snapshot. In such instances, the ransomware scan workflow is stopped after a safe snapshot is identified and a VM is spun off from the identified snapshot which has already been downloaded from the data back-up server. In some embodiments, the method 200 includes identifying all the snapshots in a given time range and restoring all the identified snapshots within the given time range.

In some embodiments, the method 200 includes generating a plurality of cloned disks based on the one or more identified safe snapshots and creating a plurality of virtual machines based on the plurality of cloned disks. In such embodiments, the method 200 includes creating multiple copies of VM based on one anchor snapshot. This workflow is useful in case of performing an original restore where the VM present in the customer environment can act as base snapshot from which multiple safe snapshots can be spun off.

Figure 5:
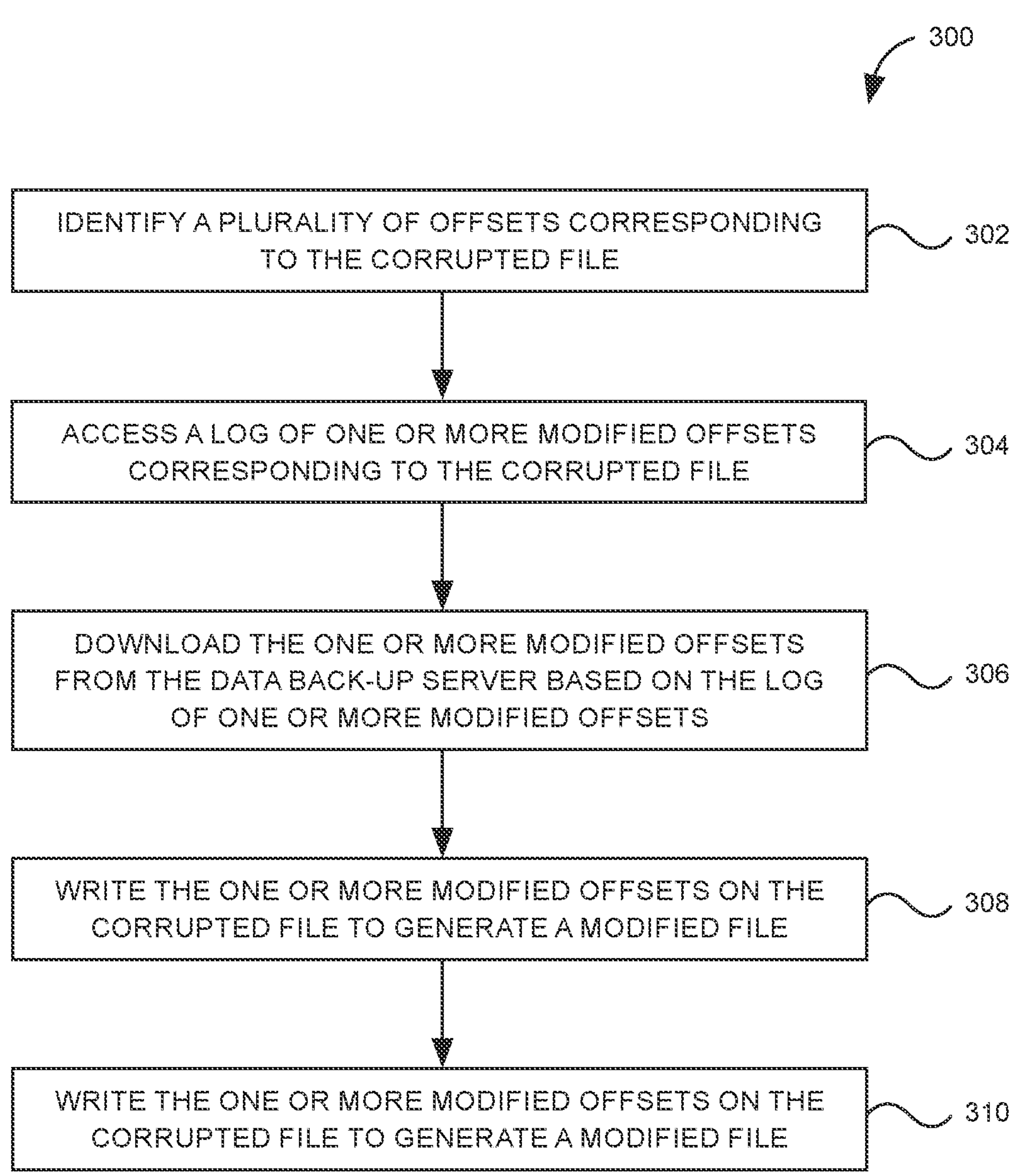
FIG. 5 is a flow chart illustrating a method for restoring a safe version of a corrupted file, according to some aspects of the present description.

In some embodiments, a method 300 for restoring a safe version of a corrupted file is presented as shown in FIG. 5.

For example, in embodiments where the ransomware scan of FIG. 3 identifies the corrupted file in a scanned snapshot. The method 300 may be implemented using the system of FIG. 3, according to some aspects of the present description. Each step of the method 300 is described in detail below.

The method 300 includes, at block 302, identifying a plurality of offsets corresponding to the corrupted file. In some embodiments, the method 300 further includes, at block 302, accessing a snapshot of a virtual machine and mounting the snapshot of the virtual machine as a base disk with the corrupted file to read the corrupted file.

The method 300 further includes, at block 304, accessing a log of one or more modified offsets from the data back-up server corresponding to the corrupted file. At block 306, the method 300 includes downloading the one or more modified offsets from the data back-up server based on the log of one or more modified offsets. The method 300 further includes, at block 308, writing the one or more modified offsets on the corrupted file to generate a modified file.

At block 310, the method 300 includes checking whether the modified file corresponds to the safe version of the corrupted file. In some embodiments, the method 300 includes, at block 310, matching the modified file with a safe version of the corrupted file, or performing a ransomware scan of the modified file to check whether the modified file corresponds to the safe version of the corrupted file.

The safe version of the corrupted file may be provided by the client in some embodiments. Once a safe version of the file is identified, the safe version of the file may be used to replace the corrupted file from running a live VM. Thus, according to embodiments of the present invention only data blocks need to be downloaded to access files. The downloaded data blocks can be kept in a local snapshot copy of a running VM, and a complete disk download is not required.

An example method for restoring a safe version of a corrupted file is described below. In one example embodiment, a virtual machine VM1 is present in a client environment and has a file abc.txt that is corrupted with a virus. A user wants to find a safe version of that file. In this example, the method includes at step 1 taking a snapshot of VM1 that will be used as a base disk to avoid downloading the complete VM that was backed up. The method further includes at step 2 mounting the base disk with file abc.txt and reading the file to identify disk offsets corresponding to the file abc.txt. For example, in this step offsets O1, O5, O9, and O18 are identified. The method further includes at step 3 querying the data back-up server for the list of offsets (O1, O5, O9, and O19) and accessing a list of offsets that were changed. For example, in this step offsets O5 and O9 are identified. The method further includes at step 4 downloading O5 and O9 and reading the file abc.txt with downloaded blocks O5 and O9, which effectively means that the backed-up version of the file abc.txt is being read. The method further includes at step 5 matching the file read with the required version (which can be provided by the user) or running a scan to confirm if the file is safe. If a safe file is not identified, the method includes iteratively repeating the steps 3-5 until a safe file is identified.

Once a safe version of the file is identified, the safe version of the file may be used to replace the corrupted file from running a live VM. Thus, according to embodiments of the present invention only data blocks need to be downloaded to access files. The downloaded data blocks can be kept in a local snapshot copy of a running VM, and a complete disk download is not required.

The systems and methods described herein may be partially or fully implemented by a special purpose computer system created by configuring a general-purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium, such that when run on a computing device, cause the computing device to perform any one of the aforementioned methods. The medium also includes, alone or in combination with the program instructions, data files, data structures, and the like. Non-limiting examples of the non-transitory computer-readable medium include, but are not limited to, rewriteable non-volatile memory devices (including, for example, flash memory devices, erasable programmable read-only memory devices, or a mask read-only memory devices), volatile memory devices (including, for example, static random access memory devices or a dynamic random access memory devices), magnetic storage media (including, for example, an analog or digital magnetic tape or a hard disk drive), and optical storage media (including, for example, a CD, a DVD, or a Blu-ray Disc). Examples of the media with a built-in rewriteable non-volatile memory, include but are not limited to memory cards, and media with a built-in ROM, including but not limited to ROM cassettes, etc. Program instructions include both machine codes, such as produced by a compiler, and higher-level codes that may be executed by the computer using an interpreter. The described hardware devices may be configured to execute one or more software modules to perform the operations of the above-described example embodiments of the description, or vice versa.

Non-limiting examples of computing devices include a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or more software applications running on the OS. Further, the processing unit may access, store, manipulate, process, and generate data in response to the execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

The computer programs may also include or rely on stored data. The computer programs may encompass a basic input/output system (BIOS) that interacts with hardware of the special-purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Figure 6:
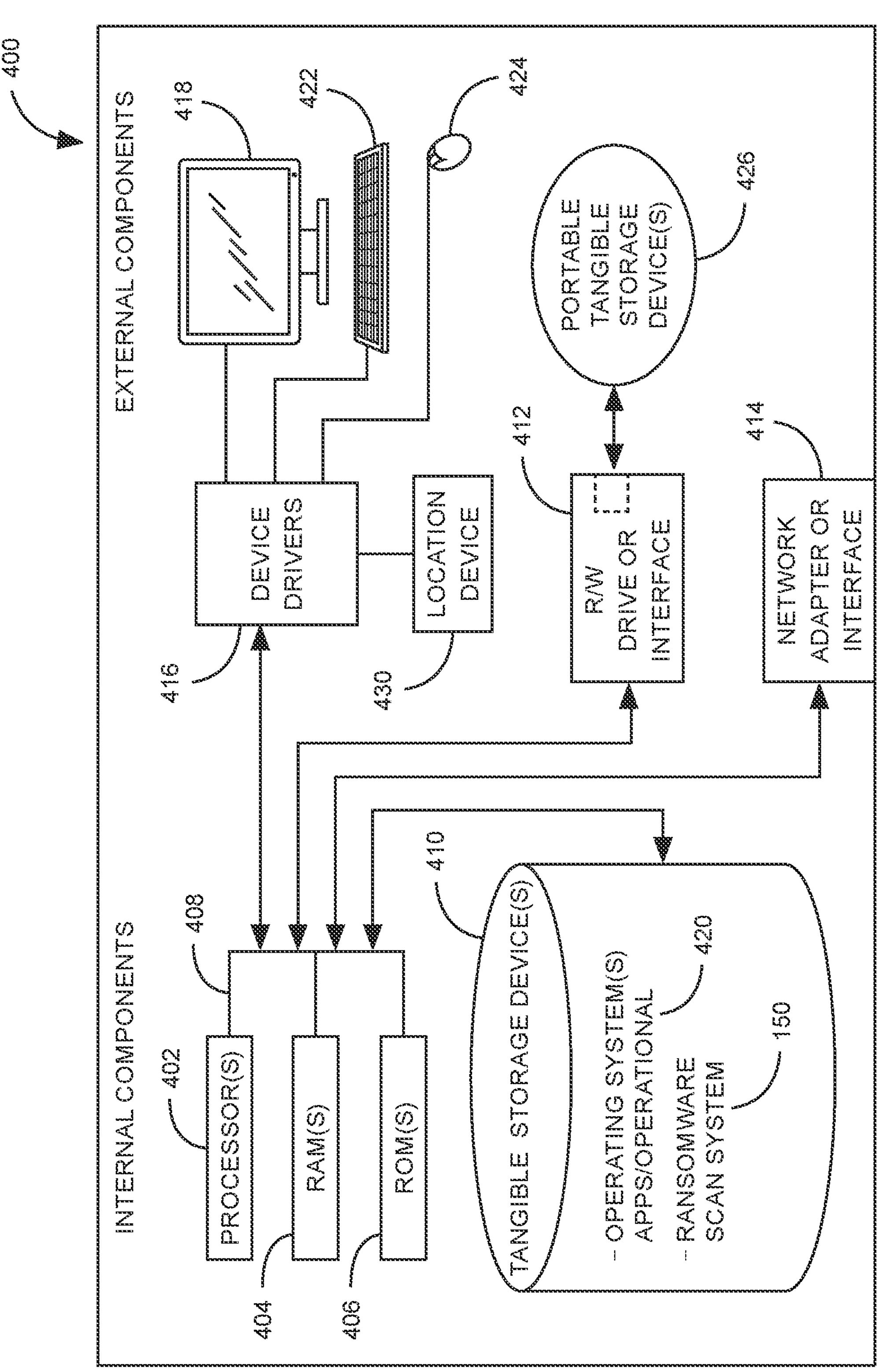
FIG. 6 is a block diagram illustrating an example computer system, according to some aspects of the present description.

One example of a computing system 400 is described below in FIG. 6. The computing system 400 includes one or more processor 402, one or more computer-readable RAMs 404 and one or more computer-readable ROMs 406 on one or more buses 408. Further, the computer system 408 includes a tangible storage device 410 that may be used to execute operating systems 420 and the ransomware scan system 150. Both, the operating system 420 and ransomware scan system 150 are executed by processor 402 via one or more respective RAMs 404 (which typically includes cache memory). The execution of the operating system 420 and/or the ransomware scan system 150 by the processor 402, configures the processor 402 as a special-purpose processor configured to carry out the functionalities of the operating system 420 and/or the ransomware scan system, as described above.

Examples of storage devices 410 include semiconductor storage devices such as ROM 506, EPROM, flash memory or any other computer-readable tangible storage device that may store a computer program and digital information.

Computer system 400 also includes a R/W drive or interface 412 to read from and write to one or more portable computer-readable tangible storage devices 426 such as a CD-ROM, DVD, memory stick or semiconductor storage device. Further, network adapters or interfaces 414 such as a TCP/IP adapter cards, wireless Wi-Fi interface cards, or 3G or 4G wireless interface cards or other wired or wireless communication links are also included in the computer system 400.

In one example embodiment, the ransomware scan system 150 may be stored in tangible storage device 410 and may be downloaded from an external computer via a network (for example, the Internet, a local area network or another wide area network) and network adapter or interface 414.

Computer system 400 further includes device drivers 416 to interface with input and output devices. The input and output devices may include a computer display monitor 418, a keyboard 422, a keypad, a touch screen, a computer mouse 424, and/or some other suitable input device.

In this description, including the definitions mentioned earlier, the term 'module' may be replaced with the term 'circuit.' The term 'module' may refer to, be part of, or include processor hardware (shared, dedicated, or group) that executes code and memory hardware (shared, dedicated, or group) that stores code executed by the processor hardware. The term code, as used above, may include software, firmware, and/or microcode, and may refer to programs, routines, functions, classes, data structures, and/or objects.

Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above. Shared memory hardware encompasses a single memory device that stores some or all code from multiple modules. Group memory hardware encompasses a memory device that, in combination with other memory devices, stores some or all code from one or more modules.

In some embodiments, the module may include one or more interface circuits. In some examples, the interface circuits may include wired or wireless interfaces that are connected to a local area network (LAN), the Internet, a wide area network (WAN), or combinations thereof. The functionality of any given module of the present description may be distributed among multiple modules that are connected via interface circuits. For example, multiple modules may allow load balancing. In a further example, a server (also known as remote, or cloud) module may accomplish some functionality on behalf of a client module.

While only certain features of several embodiments have been illustrated and described herein, many modifications and changes will occur to those skilled in the art. It is, therefore, to be understood that the appended claims are intended to cover all such modifications and changes as fall within the scope of the invention and the appended claims.

What is claimed is:

1. A system for performing a ransomware scan, the system comprising:
- a snapshot access module configured to access a base snapshot corresponding to a dataset;
- a log access module configured to access a log of modified metadata and/or data blocks from a data back-up server corresponding to a subsequent snapshot versus the base snapshot;
- an incremental block module configured to download one or more incremental metadata and/or data blocks from the data back-up server based on the log of modified metadata and/or data blocks;
- a snapshot write module configured to write the one or more incremental metadata and/or data blocks on the base snapshot to generate an incremental snapshot;
- a ransomware scan module configured to scan the incremental snapshot to check for ransomware; and
- a file restore module configured to restore a safe version of a corrupted file if the ransomware scan module identifies the corrupted file in the scanned incremental snapshot wherein the file restore module includes:
  - an offset identification module configured to identify a plurality of offsets corresponding to the corrupted file;
  - an offset log access module configured to access a log of one or more modified offsets from the data back-up server corresponding to the corrupted file;
  - an offset download module configured to download the one or more modified offsets from the data back-up server based on the log of one or more modified offsets;
  - a file write module configured to write the one or more modified offsets on the corrupted file to generate a modified file;
  - a file check module configured to determine whether the modified file corresponds to the safe version of the corrupted file; and
  - and in response to determining the modified file corresponds to the safe version of the corrupted file, replacing the corrupted file with the safe version of the corrupted file.

2. The system of claim 1, wherein, the log access module, the incremental block module, the snapshot write module and the ransomware scan module are configured to iteratively perform their respective operations for each subsequent snapshot until a safe snapshot is identified.

3. The system of claim 2, further comprising a data restore system configured to restore the dataset to a restore destination based on the safe snapshot.

4. The system of claim 3, wherein the data restore system is further configured to create a virtual machine based on the safe snapshot.

5. The system of claim 3, wherein the data restore system is further configured to generate a plurality of cloned disks based on the safe snapshot and create a plurality of virtual machines based on the plurality of cloned disks.

6. The system of claim 3, wherein the data restore system further comprises the file restore module.

7. The system of claim 1, wherein the offset identification module is further configured to access a snapshot of a virtual machine and mount the snapshot of the virtual machine as a base disk with the corrupted file to read the corrupted file.

8. The system of claim 7, wherein the file check module is configured to check whether the modified file corresponds to the safe version of the corrupted file by matching the modified file with the safe version of the corrupted file, or by performing the ransomware scan of the modified file.

9. The system of claim 1, wherein the snapshot access module is configured to access the base snapshot by:

accessing a first snapshot in a plurality of snapshots stored in the data back-up server, or taking a snapshot at a start of workflow for performing the ransomware scan.

10. A method for performing a ransomware scan, the method comprising:

(i) accessing a base snapshot corresponding to a dataset;

(ii) accessing a log of modified metadata and/or data blocks from a data back-up server corresponding to a subsequent snapshot versus the base snapshot;

(iii) downloading one or more incremental metadata and/or data blocks from the data back-up server based on the log of modified metadata and/or data blocks;

(iv) writing the one or more incremental metadata and/or data blocks on the base snapshot to generate an incremental snapshot;

(v) scanning the incremental snapshot to check for ransomware and, if a corrupted file is identified in the scanned incremental snapshot;

(vi) identifying a plurality of offsets corresponding to the corrupted file;

(vii) accessing a log of one or more modified offsets from the data back-up server corresponding to the corrupted file;

(viii) downloading the one or more modified offsets from the data back-up server based on the log of one or more modified offsets;

(ix) writing the one or more modified offsets on the corrupted file to generate a modified file;

(x) determining whether the modified file corresponds to a safe version of the corrupted file; and (xi) in response to determining the modified file corresponds to the safe version of the corrupted file, replacing the corrupted file with the safe version of the corrupted file.

11. The method of claim 10, further comprising iteratively performing the steps (ii) to (xi) for each subsequent snapshot until a safe snapshot is identified.

12. The method of claim 11, further comprising restoring the dataset to a restore destination based on the safe snapshot.

13. The method of claim 11, further comprising creating a virtual machine based on the safe snapshot.

14. The method of claim 11, further comprising generating a plurality of cloned disks based on the safe snapshot and creating a plurality of virtual machines based on the plurality of cloned disks.

15. The method of claim 11, comprising accessing the base snapshot by:

accessing a first snapshot in a plurality of snapshots stored in the data back-up server, or taking a snapshot at a start of workflow for performing the ransomware scan.

16. The method of claim 11, further comprising matching the modified file with the safe version of the corrupted file, or performing the ransomware scan of the modified file to check whether the modified file corresponds to the safe version of the corrupted file.

17. The method of claim 10, further comprising restoring the safe version of the corrupted file if the ransomware scan identifies the corrupted file in a scanned snapshot.

18. The method of claim 10, further comprising accessing a snapshot of a virtual machine and mounting the snapshot of the virtual machine as a base disk with the corrupted file to read the corrupted file.

* * * * *